J. J. BERGER AND J. GARDNER.
MOLD FOR PNEUMATIC TUBES.
APPLICATION FILED SEPT. 15, 1919.
1,362,594.
Patented Dec. 21, 1920.
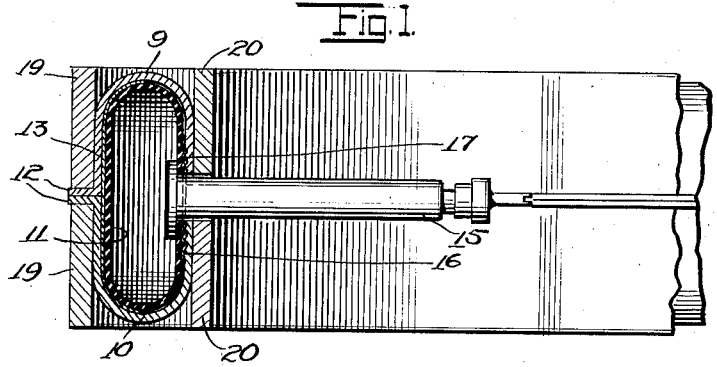
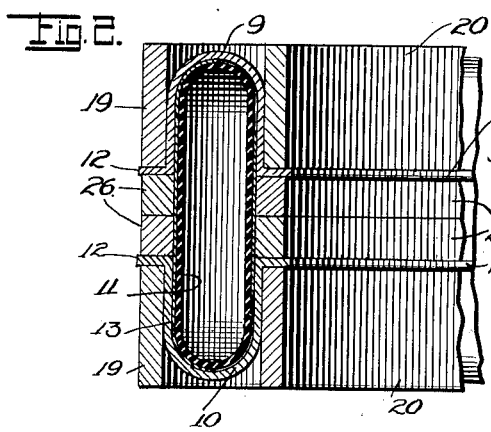
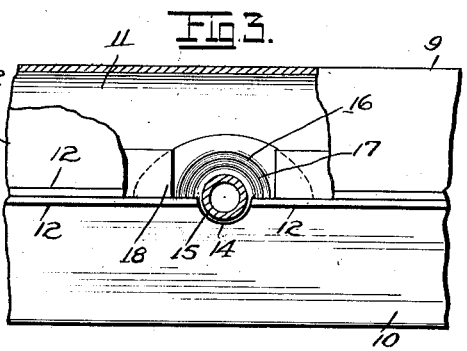
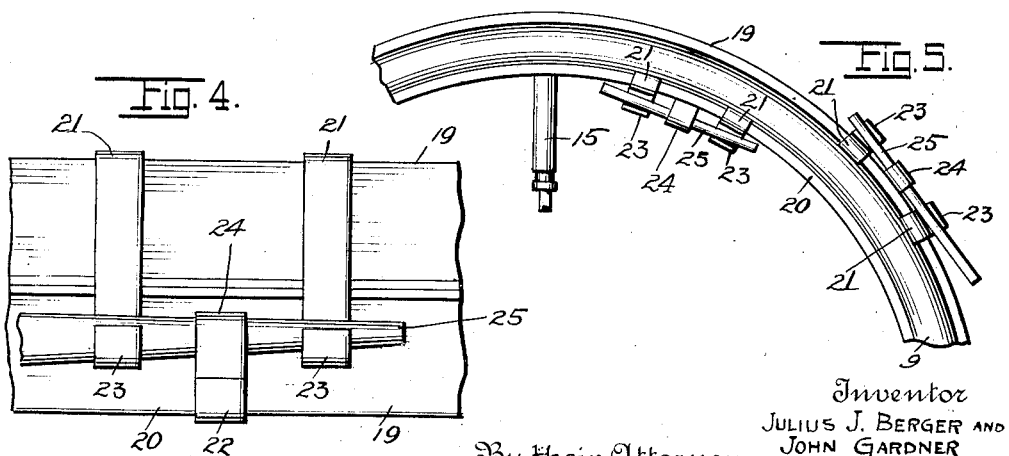
Inventor
JULIUS J. BERGER AND
JOHN GARDNER
By their Attorney

UNITED STATES PATENT OFFICE.

JULIUS J. BERGER AND JOHN GARDNER, OF UNION HILL, NEW JERSEY.

MOLD FOR PNEUMATIC TUBES.

1,362,594.

Specification of Letters Patent. Patented Dec. 21, 1920.

Application filed September 15, 1919. Serial No. 324,003.

*To all whom it may concern:*

Be it known that we, JULIUS J. BERGER and JOHN GARDNER, citizens of the United States and Germany, respectively, and residents of Union Hill, in the county of Hudson and State of New Jersey, have invented certain new and useful Improvements in Molds for Pneumatic Tubes, of which the following is a full, clear, and exact description.

Among the principal objects which the present invention has in view are: to reduce the weight of the mold; to expedite the vulcanizing by which the tube is treated; to prevent exudation of the material of which the tube is constructed; and to facilitate the assembling of the parts of the mold to accommodate tubes of various diameters.

*Drawings.*

Figure 1 is a cross section of a fragment of a mold, constructed and arranged in accordance with the present invention and of a tube disposed therein as in service relation thereto.

Fig. 2 is a similar view showing the mold expanded to accommodate a tube of larger diameter.

Fig. 3 is a detail view showing the inner side of the mold, the reinforcing rings being removed and parts of the tube being cut away to show the inner construction thereof.

Fig. 4 is a detail view showing the means adopted for locking the mold in service relation.

Fig. 5 is a detail view showing in top plan, a fragment of a mold, and means for locking the same in active service relation.

*Description.*

With the above stated objects in view, the mold half-segments 9 and 10 are constructed of aluminum or other light material. The walls of the segments are also made thin to reduce the resistance to the heat to which the tubes 11 are subjected during the operation of vulcanizing.

The segments 9 and 10 as shown in Fig. 1 of the drawings are constructed to a universal or minimum form. Each of the segments have inner and outer laterally extended flanges 12. The flanges 12 are adapted to register and are so finished at the inner side of the mold as to close the joint between the two segments when nested.

When the rubber, of which the tubes 11 are formed, is heated sufficient for vulcanizing, it will flow sluggishly but with sufficient fluidity to extend into the crevice between the flanges 12—12, thereby producing in the finished tube, a thin fin, which must be removed before the finished tube is placed in service. To avoid this, a shield plate 13 is placed in the mold. The plate 13 preferably takes the shape of the outer or tread-half of the mold. By giving the shield plate 13 the full dimension, it is steadied in the mold when air pressure is applied within the mold, and within the tube to expand the latter for pressure against the walls of the mold. The shield 13 may be provided with raised portions to form corrugations or annular grooves, which in the completed tube, would provide for circulation of air or for lateral expansion to avoid the consequences of puncture.

As seen in Fig. 3 of the drawings, the mold segments are provided with recesses 14 to form a passage for the introduction of the valve stem 15 with which pneumatic tubes of the character manufactured by the present mold, are provided. The flanges 12 of the segments are cut away at this point. To prevent the exudation under pressure of the rubber through the recesses 14, a shield plate 16 is introduced by threading it over the stem 15. To provide an added bulk of rubber at this point to better seal the joint about the stem 15, a series of circular corrugations 17 are provided in the plate 16. To close the joint between the segments 9 and 10 at the inner side of the mold, a shield 18 is placed in the mold to cover the joint between the flanges 12 of the said segments.

The segments 9 and 10 when constructed of the light material referred to, are found not sufficiently strong to hold their shape, when the air pressure necessary to the perfect formation of the tube, is introduced into the tube and mold. The curved extremities of the segments 9 and 10 have sufficient strength to resist the internal strain by the straight side walls extending between the curved ends and the flanges 12 will bulge unless reinforced. For this purpose, a series of reinforcing metal rings 19 and 20 are disposed at the outer and inner sides of the said mold segments respectively.

As seen best in Figs. 4 and 5, the rings 19 and 20 are employed as aids in locking the mold in service. For this purpose metal hooks 21 and 22 are so arranged that the looped ends 23 and 24 thereof, aline so that a tapered wedge 25 may be driven or forced therethrough with the effect that the said hooks are drawn toward each other with the effect that the rings 19 and 20 are moved together upon the flanges 12 securely locked by the mold in active service.

The hooks 21 and 22 vary in length to accommodate variation in the molds. As seen best in Fig. 2 of the drawings, this variation in the mold is accomplished by the introduction of filling rings 26. The rings 26 are finished to correspond with the inner diameters of the segments 9 and 10, so that when assembled in conjunction therewith, as seen in Fig. 2, the inner walls of the mold, formed by the said segments and the rings, are flushed. It will also be noted that in this connection the shield 13 with which the expanded mold is provided is enlarged to correspond with the shape of the expanded mold.

In Fig. 2, the rings 26 are shown in duplicate. It will be understood that single filling rings may be employed and that a number greater than the two shown may also be used.

It is obvious that when the molds are assembled and locked up with the raw tube 11 disposed therein, as above described, and as shown in the drawings, the said tubes are quickly subjected to the heat of the vulcanizing kettle or chamber in which the molds are placed for curing. It is also obvious that molds formed as herein described of material selected with reference to the diminished weight, may be more readily handled to the end that a larger output is possible with the same labor factor employed when handling molds of greater weight.

It is also obvious that after the tubes have been vulcanized or cured, the molds may be knocked down and the tube removed therefrom very quickly by striking the wedges 25 out of engagement with the hooks 21 and 22, and after removal of the said hooks, the parts of the mold may be quickly and easily separated.

*Claims.*

1. A mold as characterized comprising, a plurality of annular narrow channel mold segments, the channels in said segments being U-shaped in cross section, and means for holding said segments in closed service relation.

2. A mold as characterized comprising a plurality of annular narrow channel mold segments, the channels in said segments having parallel side walls disposed in adjacent relation, the bottom of said channel being circular in cross section, means for holding said segments in closed relation; and means adjustable within said segments for covering the joint therebetween.

3. A mold as characterized comprising a plurality of annular channel mold segments, the channels in said segments having parallel side walls disposed in adjacent relation, the bottom of said channel being circular in cross section; means for holding said segments in closed relation; and means adjustable within said segments for covering the joints therebetween, said means embodying a shield member disposed adjacent the outer walls of said segments.

4. A mold as characterized comprising a plurality of annular narrow channel mold segments, the channels in said segments having parallel side walls disposed in adjacent relation, the bottom of said channel being circular in cross section; means for holding said segments in closed relation; and means adjustable within said segments for covering the joints therebetween, said means embodying a shield member disposed adjacent the outer walls of said segments, said shield member being adapted to form the tread portion of a tube treated in said mold.

5. A mold as characterized comprising a plurality of coöperating annular channel mold segments; means for holding said segments in closed relation; and a plurality of coöperating ring members, the inner wall of one of said members corresponding, diametrically, with the inner walls of the outer sides of said segments, and the outer wall of the other ring member corresponding diametrically with the inner walls of the inner sides of said segments, the opposed surface of said ring members, when assembled with said segments, forming flushed surfaces with the walls of the channels thereof.

6. A mold as characterized comprising, a plurality of annular channel mold thinwalled segments, channels in said segments, each channel having a circular bottom and straight and parallel side walls, tangential from said bottom; and external and internal brace members forming a backing for said segments and the straight sides thereof; and means for holding said segments in closed relation.

7. A mold as characterized comprising, a plurality of annular mold segments, said segments being constructed from thin metals forming channels having parallel sides, and coöperating for forming an annular narrow tubular chamber; and rigid members engaging the outer and inner walls of said segments for preventing the spread thereof by strains internally imposed.

JULIUS J. BERGER.
JOHN GARDNER.